Figure 4:
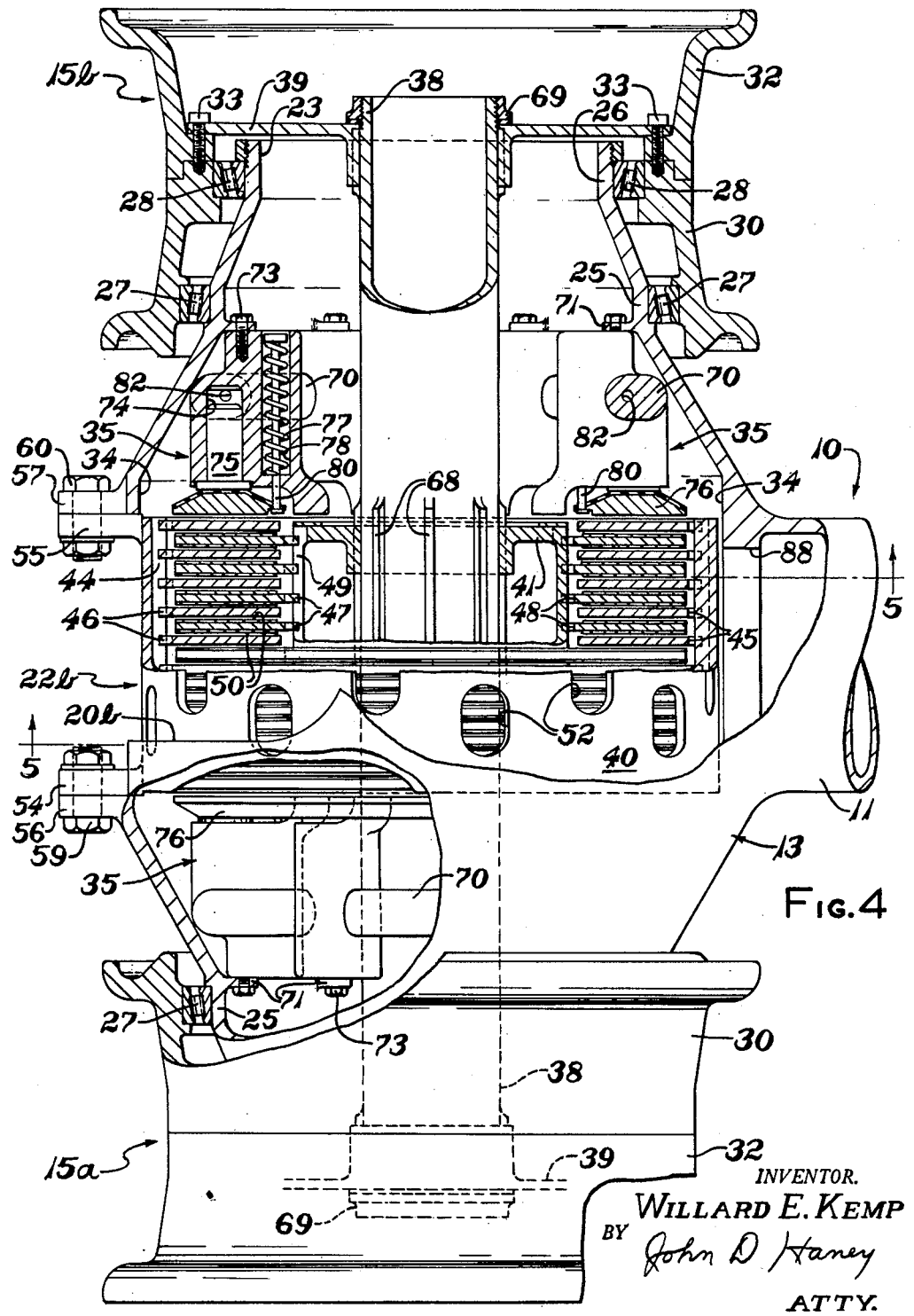

Jan. 5, 1965 W. E. KEMP 3,164,223
CARTRIDGE DISC BRAKE
Filed Feb. 23, 1960 3 Sheets-Sheet 1
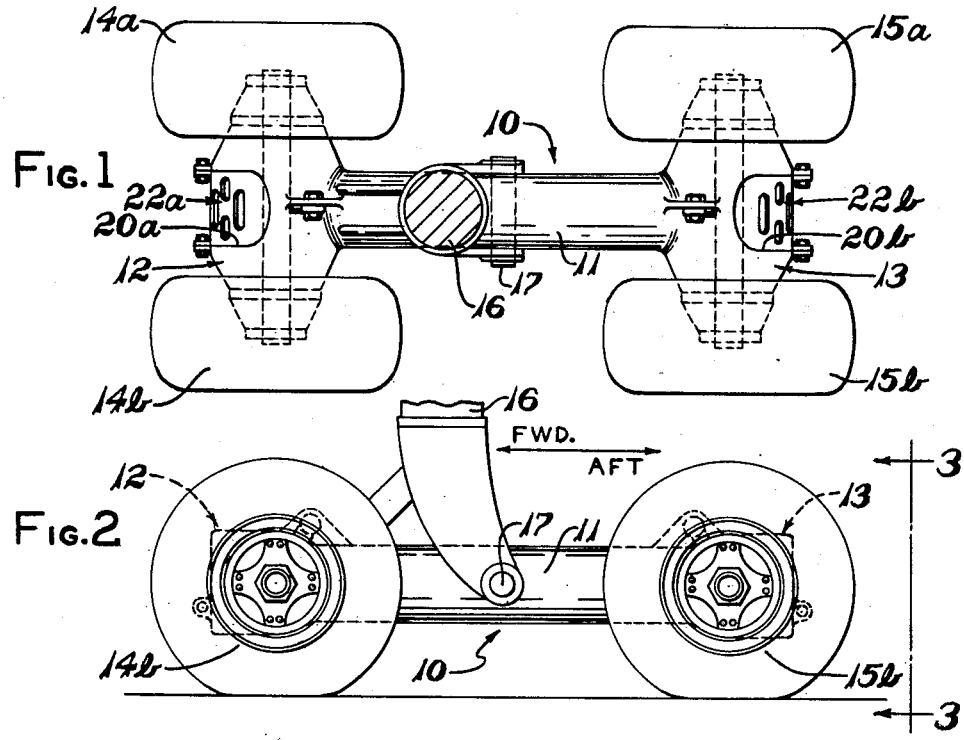
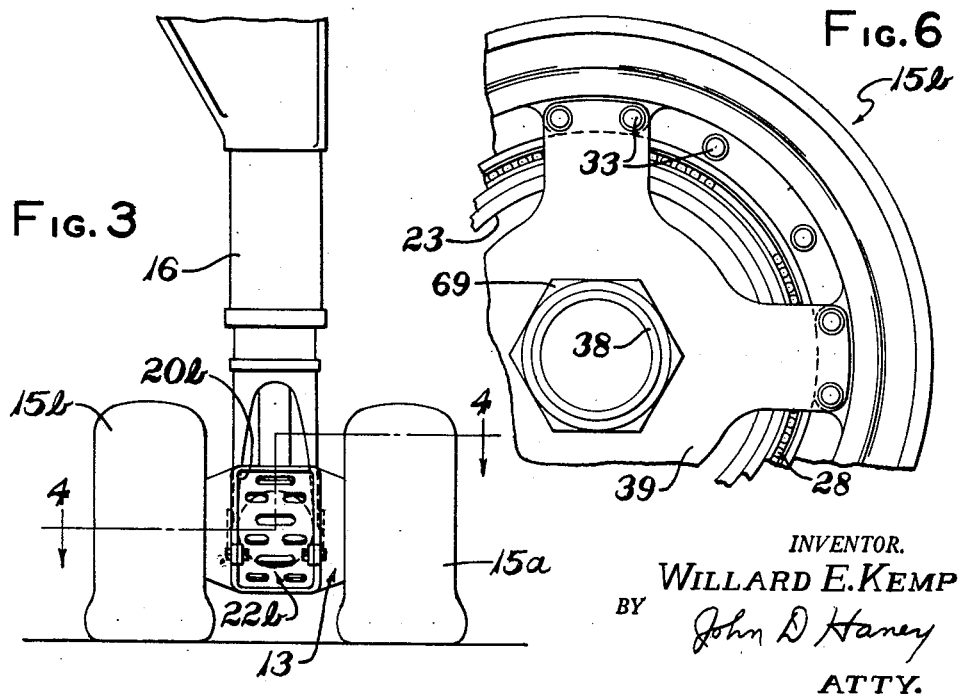
INVENTOR.
WILLARD E. KEMP
BY John D. Haney
ATTY.

Jan. 5, 1965  W. E. KEMP  3,164,223
CARTRIDGE DISC BRAKE
Filed Feb. 23, 1960  3 Sheets-Sheet 3

INVENTOR.
WILLARD E. KEMP
BY John D. Haney
ATTY.

3,164,223
CARTRIDGE DISC BRAKE
Willard E. Kemp, Troy, Ohio, assignor to The B. F. Goodrich Company, New York, N.Y., a corporation of New York
Filed Feb. 23, 1960, Ser. No. 10,186
6 Claims. (Cl. 188—17)

This invention relates to a wheel and brake assembly, and to a multi-wheeled truck or so-called bogie embodying this assembly which is especially useful for the main landing gear of a heavy airplane.

According to this invention, a wheel and brake assembly is provided in which a pair of wheels is supported on a common housing, with a single brake mechanism serving both wheels mounted inside the housing intermediate the wheels. The frictionally engaging members of the brake mechanism, i.e. both the rotatable and the non-rotatable sets of braking members, are made in a single integral package or "cartridge." This cartridge fits inside the supporting housing through an access opening therein located between the wheels. The cartridge is preferably an entirely separate structure from the actuation mechanism of the brake which is also mounted inside the supporting housing.

An advantage of this arrangement is that the brake mechanism is readily accessable for servicing from a location between the wheels. The brake cartridge and the actuation mechanism may be removed from the housing for replacement or repair quite conveniently without removing the wheels or even jacking them away from the ground. If the engageable members of the brake should become excessively hot, for example, the brake cartridge may be quickly and easily disconnected from the housing to protect the wheels and tires from heat damage. Conversely, a wheel may be replaced without disturbing the brake.

Another desirable feature of this assembly is that the brake mechanism can be effectively air-cooled owing to its location between the wheels in well-spaced axial relation to either wheel. Preferably, a suitable ventilating opening is provided in the side of the housing opposite the access opening, so that a large volume of air can flow directly through the housing across the braking members in the cartridge as the vehicle moves.

This wheel and brake assembly may be advantageously embodied in trucks having multiple pairs of wheels to provide the foregoing servicing and cooling advantages. Such a multi-wheeled truck or bogie suitable for an airplane landing gear preferably includes two such wheel and brake assemblies integrally interconnected by a single main longitudinal beam. The beam is arranged so that the housings of the assemblies are transverse to the beam to form a rigid I-shaped frame, and so that the pairs of wheels on the housings rotate parallel to the beam with the beam extending between the wheels of each pair. Preferably the beam is tubular and intercommunicates the brake-receiving region of both housings. Accordingly, the tubular beam not only provides the requisite strength and lightness, but air can enter the access opening of its front housing, pass over the braking members of the front cartridge, then lengthwise through the interior of the beam to the rearward braking members, and then out the rearward access opening in substantially a steady flow to assist in dissipating heat generated in the braking members.

The invention will be further described with reference to the accompanying drawings which show, as one example of how this invention may be practiced, a multi-wheeled airplane landing gear truck made in accordance with and embodying this invention.

Figure 5:
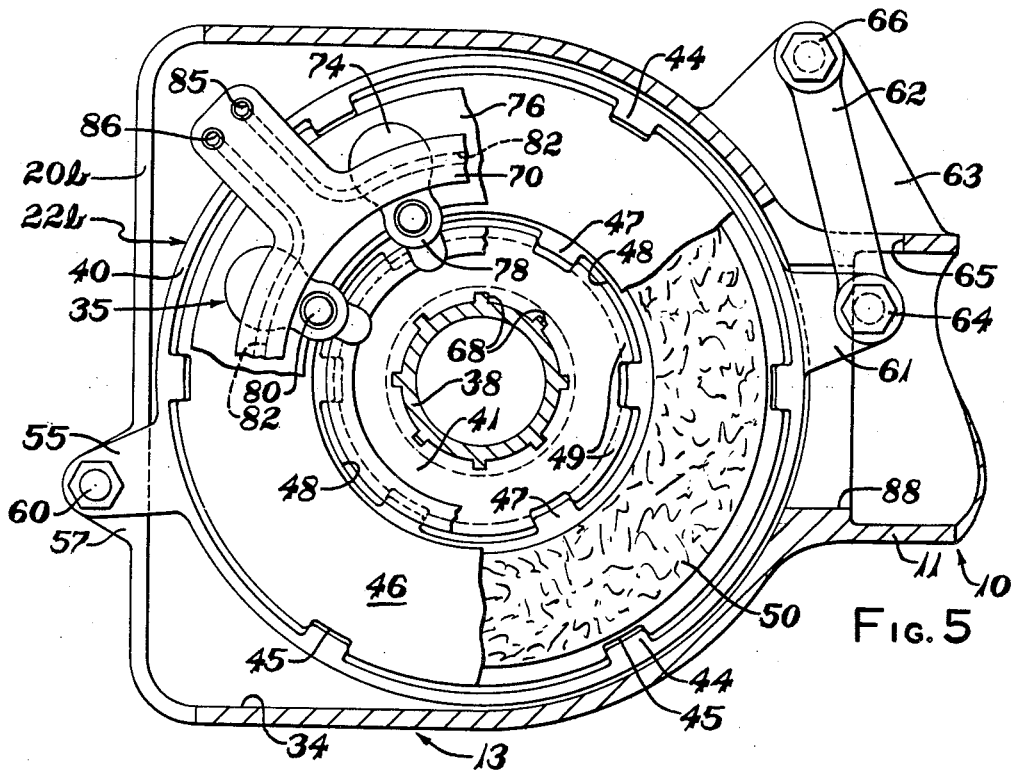
Figure 7:
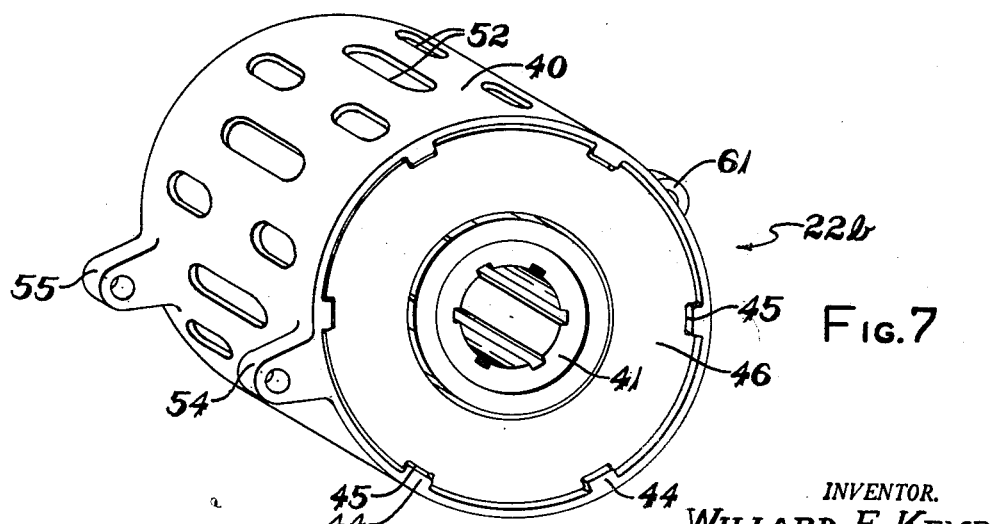

In the drawings:
FIG. 1 is a plan view of the truck looking down on it from a location in the airplane;
FIG. 2 is a side elevation of FIG. 1;
FIG. 3 is an end elevation of FIG. 2 on the line 3—3;
FIG. 4 is an enlarged sectional view taken approximately along the line 4—4 of FIG. 3, the tires being removed from the wheels;
FIG. 5 is a sectional view taken approximately on the line 5—5 of FIG. 4;
FIG. 6 is an enlarged fragmentary view of the rim portion of a wheel, the tire being removed; and
FIG. 7 is a perspective view of the cartridge containing a set of brake members.

Referring to FIG. 1, the truck has a generally I-shaped hollow frame 10 formed of a main longitudinal tubular beam 11 with two integral transverse hollow end housings 12 and 13. Two front wheels 14a, 14b are mounted directly on the front housing 12 at its outer ends for rotation parallel to the beam and flanking the beam. Two rear wheels 15a, 15b are mounted on the rear housing 13 in tandem with the corresponding front wheels. Between the front and rear wheels, the beam is connected to a strut 16 depending from the aircraft. The truck may be swung pivotally on the strut about horizontal pivot 17 as the truck is raised or lowered relative to its normal ground engaging position in FIG. 2.

In the forwardly facing side of front housing 12, between the two front wheels, there is a large access opening 20a opposite the junction of beam 11 through which opening a front brake cartridge 22a is inserted into the housing for braking both front wheels. Similarly, in the rearward side of rear housing 13, between the rear wheels, there is an access opening 20b in alignment with beam 11 and through which a brake cartridge 22b (identical to cartridge 22a) is inserted inside the rear housing for jointly braking rear wheels 15a and 15b.

FIG. 4 shows the details of the structure and assembly of the rear wheels 15a, 15b and brake cartridge 22b with rear housing 13. Since the front wheels 14a, 14b and front cartridge 22a are identical in structure to the rear wheels and rear cartridge, and are assembled with front housing 12 in exactly the same way, the following description of the rear wheel assembly in FIG. 4 will apply equally to the front wheel assembly.

Referring to FIG. 4, the central beam 11 is preferably a circular tube joined integrally to the rear transverse end housing 13. One each side of its junction with beam 11, housing 13 tapers somewhat conically toward opposing axially open ends 23. As shown, the outside surface of the housing adjoining end 23 on which rear wheel 15b is mounted has two cylindrical ledge portions 25 and 26 seating wheel bearings 27 and 28, respectively. Wheel 15b is formed of two axially mating sections 30 and 32. The inboard wheel section 30 is suported near its tire flange on bearing 27, and at its opposite annular margin (i.e. the center region of the wheel) on bearing 28. The outboard wheel section 32 is in turn fastened axially against section 30 by a series of tie bolts 33. Wheel 15a is identical to wheel 15b and is mounted in exactly the same way on the opposite end 23 of housing 13.

The brake cartridge 22b is housed entirely inside the wide center portion 34 of rear housing 13 and is axially flanked on its opposite sides by two separate actuation mechanisms 35 mounted inside the conical portions of the housing. The actuation mechanisms 35 preferably operate independently of each other, one being for normal operating service, and the other for emergency service. Preferably either is fully capable of operating the brake members of the cartridge. Other than to engage the cartridge to operate its brake members as is hereinafter explained, the actuation mechanisms 35 are structurally separate from the cartridge.

In addition to the two actuating mechanisms 35, and the cartridge 22b, there is a tubular "floating" rod or axle 38 inside the housing, each end of which is fastened to a spider 39 engaged with the adjacent wheel. Through these spiders 39, the axle rod 38 interconnects the wheel 15a with wheel 15b and with the rotatable members of the cartridge 22b in the manner hereinafter described to provide for synchronous rotation of these parts.

The cartridge 22b (see also FIG. 7) has an outer cylindrical shell 40 concentric with an inner hub 41. On the inside surface of shell 40 there are axial torque lugs 44 which loosely interlock with slots 45 (see FIG. 5) at the outer periphery of a series of annular brake discs 46 serving as so-called heat-sink members of the brake. Interleaved with the discs 46 in radially overlapping relation is a series of annular lining carriers 47 which are loosely mounted by axial slots 48 on the inner periphery of the carriers on axial lugs 49 on the periphery of the hub 41. The discs 46 and the lining carriers 47 are plane annular members and the lining carriers have a suitable friction lining material 50 fastened on their opposing faces.

The outer shell 40 of the cartridge is perforated by a series of transverse slots 52 to ventilate the interior of the cartridge and so that air can pass generally diametrically across the disc and lining carriers and through the shell 40 from one side to the other.

The cartridge 22b is removable from and may be inserted as a unit into housing 13 through access opening 20b as previously described. When inside the housing, the cartridge is fastened to the housing at only three places, viz. by means of two projecting lugs 54 and 55 on the shell 40 which register with corresponding mating lugs 56, 57, respectively, on housing 13 on opposite sides of opening 20b to receive bolts 59 and 60; and by a lug 61 (see FIG. 5) projecting from shell 40 on its side opposite the aforesaid lugs. The latter lug 61 is connected through a link 62, bolts 64 and a lug 63 (FIG. 5) on housing 13 near the junction with beam 11. Link 62 extends upward through a slot 65 (FIG. 5) in beam 11 to lug 63 to which it is fastened by bolt 66.

When the cartridge is fastened in housing 13, hub 41 of the cartridge is coaxial with the wheels. Rod 38 extends through housing 13 axially of the wheels and also fits axially through hub 41. The region of rod 38 embraced by the hub has a series of external splines 68 engaged with corresponding splines inside hub 41 so that rod 38 is in driving engagement with hub 41. The opposing ends of the rod 38 are keyed to each of the spiders 39 and additionally fastened thereto by a lock nut 69. The tips of the spider arm are in turn fastened to their respective wheel rims by the wheel tie bolts 33. Each spider 39 has four arms and is of cruciform shape (see FIGS. 2 and 6).

The tubular axle rod 38, it should be noted, does not support the wheels for rotation since the wheels are supported directly on the ends of the housing 18a. The function of the axle rod 38 is to rigidly interconnect the opposing wheels for synchronous rotation with each other and with hub 41 of the cartridge so that the lining carriers 48 in turn rotate between the non-rotatable discs 46.

The actuation mechanisms 35 are located in each of the tapering portions of the housing axially flanking the cartridge 22b. Each actuation member consists of an annular body member 70 (FIG. 4) fastened to lugs 71 on the interior of the housing 13 by bolts 73. In the side of each member 70 directed toward the cartridge 22b there is a series of cylinders 74 with pistons 75, the outer ends of which collectively engage an annular pressure plate 76. The latter is in turn biased to a position away from the cartridge 22b by a series of retractor springs 77 housed in openings 78 inside body member 70 and which act against rods 80 connected to the pressure plate 76. The body member 70 further includes passages 82 for conducting hydraulic fluid to the closed end of each cylinder 74, the passages 82 forming with the cylinders 74 a continuous circuit from an inlet connection 85 to outlet connection 86 (see FIG. 5). In response to the pressure of this hydraulic fluid on pistons 75 sufficient to overcome the biasing force of the retractor springs 77, pressure plate 76 is urged axially against the cartridge 22b into engagement with the outermost disc 46 of the cartridge. The stack of discs 46 and lining carriers 47 are thereby pressed together in frictional engagement one with another and against the pressure plate 76 of the opposing actuation mechanism 35. Normally, only one of the actuation mechanisms 35 need be operated at any given time to engage the brake. Insofar as the brake construction is concerned, however, the brake may be engaged by operating both these mechanisms simultaneously.

From FIG. 4 it may be noted that the rear cartridge 22b when assembled in the housing 13 is in alignment with and communicated with the hollow tubular interior of beam 11 through an opening 88. The cartridge 22b is also in communication with a similar front cartridge in the front housing 12 through beam 11. Inasmuch as the beam 11 in its lowered or operating position relative to the airplane is disposed fore and aft of the airplane, air at high velocity can enter the access opening 20a of the front housing 12, pass diametrically through shell 40 through its slots 52 in the front cartridge 22a and around the brake discs 46 and lining carriers 47, and then along the interior of beam 11, and then diametrically through the rear cartridge 22b, and finally out through the rear access opening 20b in the rear housing 13. There is practically a continuous flow of a large volume of air via this route during a braking operation which materially assists in dissipating heat generated in the braking discs.

To remove the rear cartridge 22b, first the lock nut 69 (see FIG. 4) at the outside ends of axle rod 38 are removed, and then the spiders 39 are removed from each wheel and from engagement with rod 48. Then the rod 38 is slid axially out of the hub portion 41 of the cartridge and withdrawn from between the wheels. Then by merely loosening three bolts, the bolts 59 and 60, and bolt 66 connecting link 62 to lug 63, the entire cartridge 22b may be withdrawn from housing 13 through its access opening 20b from a position between the rear wheels 15. The front cartridge is removed in exactly the same manner. Ordinarily, it will be convenient to replace these cartridges as a unit although it is relatively easy to merely replace the discs and lining carriers in them if desired and then immediately reinstall the cartridge. Normally the actuation mechanisms 35 require little servicing but these may be removed through the access opening of their respective housings, if desired, by loosening bolts 73 through the open ends 23 of the housings.

Variations in the construction described may be made within the scope of the appended claims.

I claim:

1. A disc brake mechanism in the form of an integral cartridge which is adapted to be installed on or removed as a complete unit from a housing mounting a wheel assembly, the mechanism consisting of a cylindrical outer shell with external lug members thereon for fastening the entire mechanism as well as said shell to said housing, a first series of annular disc-like braking members in splined engagement at their outer periphery with the interior of said shell, a hub member concentric with said first series of braking members and said outer shell and enclosed within the envelope of said shell, a second series of annular disc-type braking members in splined engagement at their inner periphery with said hub and interleaved with said first series, and means on said hub and on said shell for mounting said mechanism for relative rotation between their respective disc-like braking members.

2. A mechanism according to claim 1 in which said cylindrical outer shell has a plurality of openings therein from its outside to its inside surface.

3. A brake assembly comprising an open ended tubular housing; an access opening into one side of said housing; a disc brake mechanism inside said housing at said access opening, said entire brake mechanism being in the form of an integral cartridge which is adapted to be inserted into or removed from said housing as a complete unit through said access opening, said mechanism having a cylindrical outer shell with means for connecting the shell to said housing, a first series of annular disc-like braking members in splined engagement at their outer periphery with said shell, a hub member concentric with said first series of braking members and said outer shell and enclosed within the envelope of said shell, and a second series of annular disc-type braking members in splined engagement at their inner periphery with said hub; and brake actuating means inside said housing separate from said brake mechanism cartridge but adjoining said braking mechanism for urging said discs of said first and second series into lateral braking engagement one with another.

4. A brake assembly comprising a main longitudinal beam with two hollow transverse housings integral with and spaced apart lengthwise of said beam; an access opening into each said housing; a disc brake mechanism inside each said housing at said access opening thereof, said entire brake mechanism being in the form of an integral cartridge which is adapted to be inserted into or removed from said housing as a complete unit through said access opening, said mechanism having a cylindrical outer shell with means for connecting the shell to said housing, a first series of annular disc-like braking members in splined engagement at their outer periphery with said shell, a hub member concentric with said first series of braking members and said outer shell and enclosed within the envelope of said shell, and a second series of annular disc-type braking members in splined engagement at their inner periphery with said hub; and brake actuating means inside each housing independent of said cartridge but adjoining said brake mechanism therein for bringing the discs of the brake mechanism into braking engagement one with another.

5. A brake assembly according to claim 4 wherein said shell of each said brake mechanism is perforated and wherein said beam is hollow to provide communication for air flow from the access opening of one said housing, through its respective brake mechanism, and through the beam, and through the brake mechanism of the other of said housings to the access opening of the latter housing.

6. A brake assembly according to claim 4 wherein means is engaged with said beam intermediate said housings for mounting said assembly to a vehicle.

References Cited by the Examiner
UNITED STATES PATENTS

| | | | |
|---|---|---|---|
| 2,237,234 | 4/41 | Lambert | 188—72 |
| 2,410,133 | 10/46 | Spatta | 180—75 |
| 2,532,605 | 12/50 | Castleberry | 180—75 X |
| 2,555,182 | 5/51 | Butler | 188—18 |
| 2,602,612 | 7/52 | Zimmerman et al. | 244—103 |
| 2,620,235 | 12/52 | Butler | 301—36 |
| 2,644,654 | 7/53 | Mercier | 188—18 X |
| 2,707,604 | 5/55 | Dowty | 244—111 |
| 2,875,855 | 3/59 | Albright | 188—18 |
| 2,916,105 | 12/59 | Dasse et al. | 188—72 |
| 2,964,137 | 12/60 | Luedtke et al. | 188—71 |

EUGENE G. BOTZ, *Primary Examiner.*

T. GRAHAM CRAVER, A. JOSEPH GOLDBERG, ARTHUR L. LA POINT, *Examiners.*